(12) United States Patent
Jenkins

(10) Patent No.: US 7,147,037 B2
(45) Date of Patent: Dec. 12, 2006

(54) LEAK DETECTOR FOR MIXED HEAT EXCHANGERS

(75) Inventor: Maurice A. Jenkins, Casselberry, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 341 days.

(21) Appl. No.: 10/691,934

(22) Filed: Oct. 23, 2003

(65) Prior Publication Data

US 2005/0087324 A1 Apr. 28, 2005

(51) Int. Cl.
  *G01K 1/16* (2006.01)
  *G01N 25/72* (2006.01)
(52) U.S. Cl. .................... 165/11.1; 374/5; 374/135
(58) Field of Classification Search .............. 165/11.1; 374/4, 5, 135, 142; 73/29.05, 40.5 R
  See application file for complete search history.

(56) References Cited

U.S. PATENT DOCUMENTS

| | | | | |
|---|---|---|---|---|
| 3,531,264 A | * | 9/1970 | Greipel | 73/40.5 R |
| 3,874,222 A | * | 4/1975 | Ladd et al. | 374/4 |
| 4,336,708 A | * | 6/1982 | Hobgood et al. | 374/5 |
| 4,527,908 A | * | 7/1985 | Arisi | 165/11.1 |
| 4,672,842 A | * | 6/1987 | Hasselmann | 374/4 |
| 4,848,926 A | * | 7/1989 | Jenkins | 374/142 |
| 4,968,151 A | * | 11/1990 | Thomson | 374/135 |
| 5,048,973 A | * | 9/1991 | Liebert et al. | 374/29 |
| 5,171,524 A | * | 12/1992 | Niolon | 73/29.05 |
| 5,177,468 A | * | 1/1993 | Baldwin et al. | 340/652 |
| 5,637,789 A | * | 6/1997 | Lawson | 73/40.5 R |
| 6,406,180 B1 | * | 6/2002 | Walker et al. | 165/11.1 |
| 6,902,316 B1 | * | 6/2005 | Pierce et al. | 374/4 |

* cited by examiner

*Primary Examiner*—Ljiljana Ciric

(57) ABSTRACT

A leak detector for mixed heat exchangers. In mixed heat exchangers it is important to monitor leaks from the liquid flows to the gas flows since liquid can damage delicate machinery. A barrier is mounted on the gas side of the heat exchanger. The barrier contains at least two thermometers, one of which is thermally isolated from the gas flow inside of the barrier, and another which is in contact with the barrier. When cooler water droplets and vapor enter the gas flow they will come into contact with the barrier. This will lower the measured temperature dramatically in the thermometer which is in contact with the barrier, while the isolated thermometer will not have its measured temperature quickly lowered by the leak. Therefore a different in the measurement in the change in temperature of the thermometers will indicate a leak in the heat exchanger.

5 Claims, 3 Drawing Sheets

LEAK DETECTOR FOR MIXED HEAT EXCHANGERS

BACKGROUND

Many complex and expensive high power systems use mixed heat exchangers to dissipate the waste heat. A mixed heat exchanger can be defined by the use of one medium to cool another. For example, air or hydrogen gas may be used as a cooling medium for the power system components and then the resulting heat contained in the air or hydrogen is cooled by a liquid. Gas or hydrogen by itself is easy to control, is clean, and is electrically insulative. In areas where environmental requirements dictate, a closed loop, self-contained cooling system is used to keep out containments and moisture. In a self-contained cooling system, hydrogen gas is often selected as it offers low windage and ventilation losses due to its low density. Ventilation losses are proportional to the gas density. Additionally, hydrogen has a much higher thermal conductivity that air. Therefore in a closed system, hydrogen gas makes a good choice in cooling high powered electrical systems, such as large electric generators. Waste heat in a closed system must be efficiently extracted to the outside. Liquid, on the other hand, conducts heat much better than gas, allowing for a greater heat transference.

Mixed heat exchangers use both gas and liquid arrangements to capitalize on the advantages of both. Gas is -circulated through a system, such as the internal workings of a power generator, cooling desired sub-systems until the heat capacity of the gas is reached. The warm gas is then typically regenerated by passing in close contact with a cooler liquid, such as water. As the gas passes in close contact with the water, the heat is transferred to the water, cooling the gas so that is may once again by cycled through the system.

Though there are various types of contacts between the gas and water, it is usually desired that there be no direct physical contact between the two. This is so the gas remains dry and does not pick up any water vapor or droplets. In fact, water contamination is one of the primary problems in dealing with mixed heat exchangers.

FIG. 1 illustrates a simplified example of how gas in a mixed heat exchanger may be cooled by water flow. Heated gas 2 that has cooled a different part of the system enters a heat exchanger area 4 that typically comprises some bends or spirals. Cooler water 6 flows in close proximity to the gas 8, but is separated from it by some form of barrier 10. Since the nature of the heat exchanger relies on the ability to effectively transfer heat from the gas to the water, it is necessary that the barrier be as thin as possible. Cracks or fissures form in the barrier 12 which causes a leak in of water into the gas flow 14.

In order to determine if there are water leaks, current methods involve using float valves with the gas portion of the mixed heat exchangers. When water pools in places, buoyant martial floats on the water, indicating a leak. This technique only works for large leaks, and relatively small leaks that disperse minute water droplets are not detected. Another technique is to measure the dew point inside of the gas portions of the mixed heat exchangers. Though this will allow for the eventual detection of small leaks, it takes a long time before a small leak increases the dew point of the large volume of gas in the heat exchanger to register on the dew point monitors.

What is needed is a leak detector for mixed heat exchangers that can reliably determine if there is a leak, as well as the approximate location of the leak in the exchanger.

SUMMARY OF THE INVENTION

The present invention discloses leak detectors for mixed heat exchangers. In mixed heat exchangers it is important to monitor leaks from the liquid flows to the gas flows since liquid can damage delicate machinery. The present invention comprises a shield, also referred to as a barrier, mounted on the gas side of the heat exchanger or placed on components located within the gas flow, down stream of the heat exchanger. In some embodiments the shield is thermally conductive. The barrier contains at least two thermometers, at least one of which is substantially exposed to the gas flow and at least one of which is substantially isolated from the gas flow. When cooler water droplets and vapor enter the gas flow they will come into contact with the thermometer that is in substantial contact with the gas flow, lowering the measured temperature dramatically. The isolated thermometer will not have its measured temperature quickly lowered by a leak. Therefore a difference in the indicated temperature measurement signature is observed due to the rate of change in temperature of the exposed thermometer versus the isolated thermometer will indicate a leak in the heat exchanger.

In one embodiment of the present invention the leak detector comprises a barrier mounted on the gas side of a heat exchanger with two thermometers therein. The exposed thermometer is securely affixed to the barrier and the isolated one is freely mounted inside. The barrier comprises a thermally conductive material that the affixed thermometer measures the temperature of. As water droplets strike the barrier, its temperature is lowered quickly and measured by the affixed thermometer. The freely mounted thermometer will take longer to measure the drop in temperature, and the difference between the two thermometer readings over time will indicate a leak.

In one embodiment the barrier forms a shield around one side the isolated thermometer, protecting it from the impact of water droplets, but otherwise leaving it open to the gas flow.

In another embodiment the two thermometers are in close proximity, though the exposed thermometer is not part of the barrier assembly.

In a particular embodiment, multiple exposed thermometer placed at varying locations are compared to a few number of isolated thermometers.

DETAILED DESCRIPTION OF THE INVENTION

Figure 1:
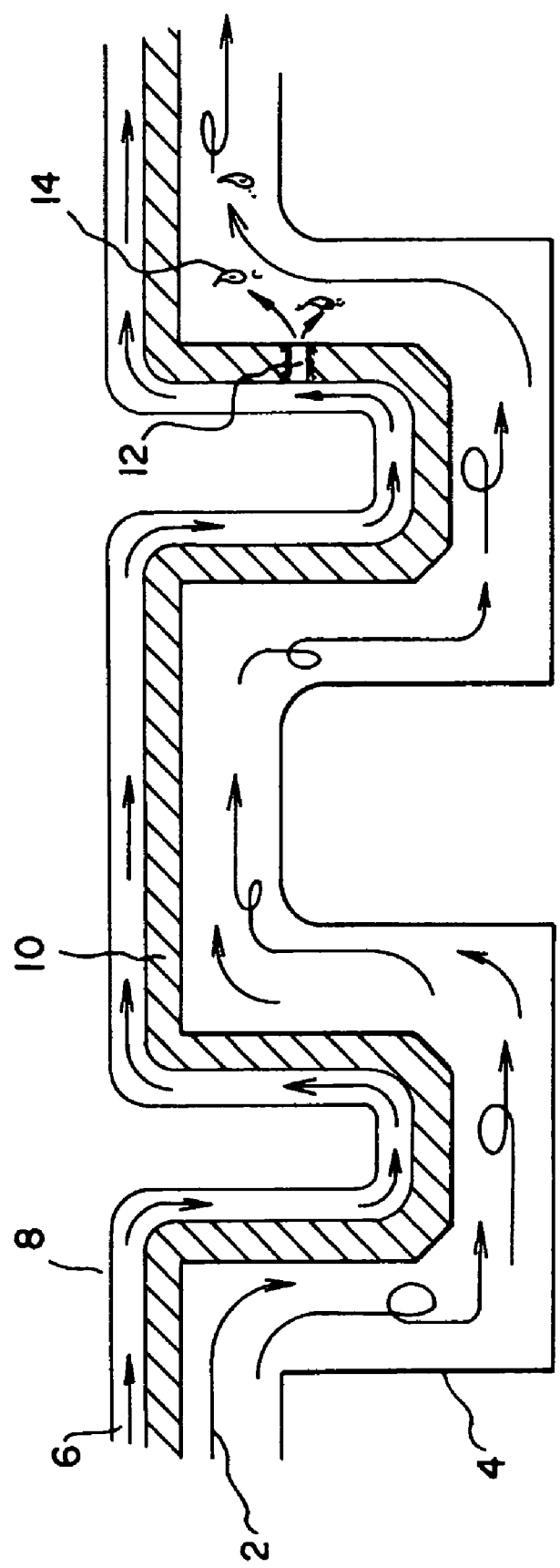
FIG. 1 illustrates a simplified example of a mixed heat exchanger with a leak.

The present invention discloses leak detectors for mixed heat exchangers. In mixed heat exchangers it is important to monitor leaks from the liquid flows to the gas flows since liquid can damage delicate machinery. The present invention comprises a barrier mounted on the gas side of the heat exchanger. The barrier contains at least two thermometers, at least one of which is substantially exposed to the gas flow and at least one of which is substantially isolated from the gas flow. When cooler water droplets and vapor enter the gas flow they will come into contact with the thermometer that is in substantial contact with the gas flow, lowering the measured temperature dramatically. The isolated thermometer will not have its measured temperature lowered as quickly by leak. Therefore a difference in the measurement in the change in temperature of the exposed thermometer versus the isolated thermometer will indicate a leak in the heat exchanger.

The barrier functions to keep the isolated thermometer out of direct contact with the water droplets and vapor, while at the same time allowing it to read the relative ambient temperature of the gas flow. The barrier therefore acts as a physical barrier to the water leaked into the gas flow, while allowing for substantial thermal contact with the gas flow. In one embodiment the barrier is mounted in a gas flow passage, but seals the isolated thermometer off from the gas flow. Since the isolated thermometer still needs to have an approximate reading of the gas flow temperature, in this embodiment the barrier is formed from thermally conducting material, like a thin metal. However, the isolated thermometer freely mounted inside of the barrier such that it is not in direct contact with the conducting material.

In other embodiments the isolated thermometer is shielded from direct contact with water vapor, but is substantially open to the gas flow. In this embodiment the barrier still acts as a physical barrier, but does not have to be thermally conductive.

The exposed thermometer can be in direct, unshielded contact with the gas flow, or it may be contained within the barrier. When contained within the barrier, the barrier is made of thermally conductive material, and the exposed thermometer is in direct contact with it. In this manner, temperature changes to the barrier are quickly transferred to the exposed thermometer. In this embodiment the exposed thermometer is isolated from the constant forces of the gas flow and thereby has a greater life span.

The isolated and exposed thermometers may be placed together in one location, and even one barrier, or may be spaced apart. In one embodiment all thermometers have their own barrier. In another embodiment the exposed thermometer is placed in a location in the gas flow system where leaked water is expected to gather. In a related embodiment the isolated thermometer is placed in a location in the gas flow system where leaked water is expected not expected to reach.

The present invention requires at least two thermometers. However there may be multiple pairs of thermometers through the gas flow system. In this embodiment the relative differences in temperatures between pairs of thermometers will be different depending on the location of the leak. By using multiple pairs of thermometers spaced apart, an approximate location of the leak can be determined, since the longer water droplets are suspended in the gas flow the warmer they become.

In an alternate embodiment the thermometers are not placed in matching pairs. For example, one isolated thermometer is used to compare changes in temperature with two or more exposed thermometers. In this embodiment it is expect that regions of gas flow in the system are substantially similar, and only a single isolated thermometer is needed to compare against multiple exposed thermometers.

In one embodiment of the present invention the leak detector comprises a barrier mounted on the gas side of a heat exchanger with two thermometers therein. The exposed thermometer is affixed to the outside of the barrier and the isolated one is freely mounted inside. The barrier comprises a thermally conductive material that the affixed thermometer measures the temperature of. As water droplets strike the barrier, its temperature is lowered and measured by the affixed thermometer. The isolated thermometer will take longer to measure the drop in temperature, and the difference between the two thermometer readings over time will indicate a leak.

In one embodiment the barrier forms a shield around one side the isolated thermometer, protecting it from the impact of water droplets, but otherwise leaving it open to the gas flow.

In another embodiment the two thermometers are in close proximity, though the exposed thermometer is not part of the barrier assembly.

In a particular embodiment, multiple exposed thermometer placed at varying locations are compared to a few number of isolated thermometers.

Figure 2:
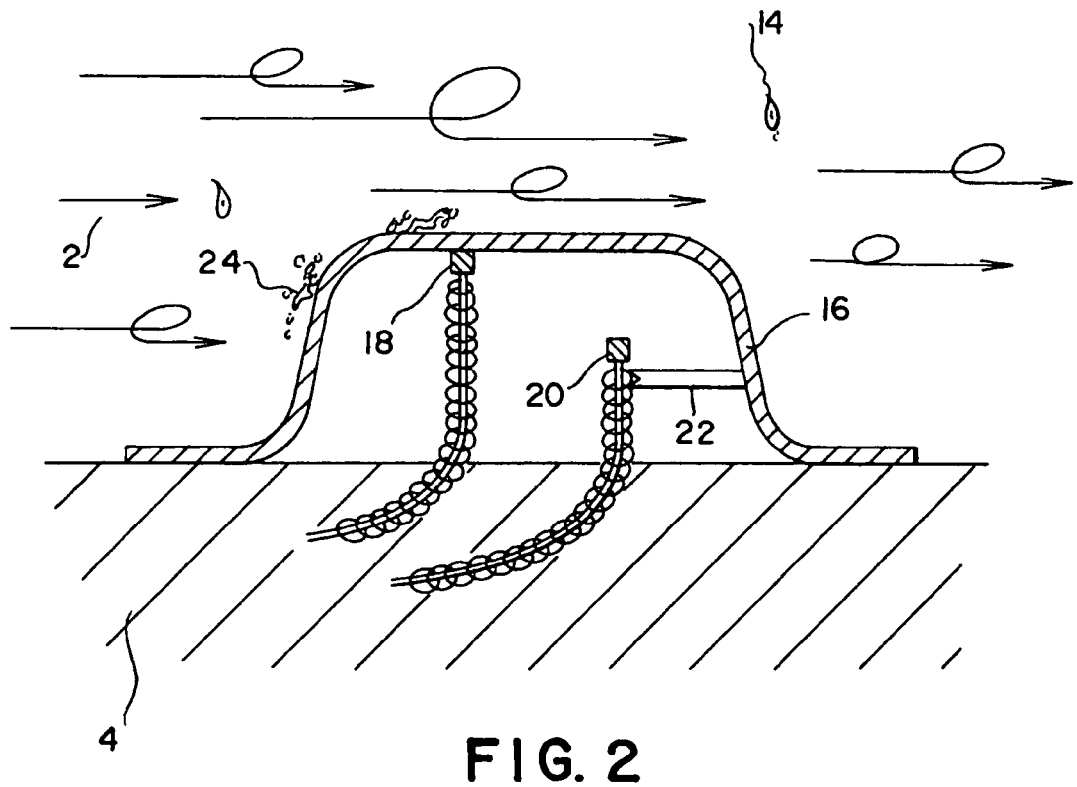
FIG. 2 illustrates a leak detector according to one embodiment of the present invention.

FIG. 2 illustrates a particular embodiment of the present invention. Gas 2 flowing through a corridor in the gas flow system 4 of a mixed heat exchanger flows past a barrier 16 mounted therein. In the barrier is an exposed thermometer 18 and an isolated thermometer 20. Since the exposed thermometer does not have direct contact with the gas flow, in this embodiment the barrier is composed of a thermally conductive material. The isolated thermometer is therefore freely mounted using a non-thermally conductive support 22 inside of the barrier, such that it is not in contact with the thermally conductive material. Water droplets suspended in the gas flow 14 and water vapor strike the exterior of the barrier 24, rapidly cooling its temperature. The exposed thermometer, which is in thermal contact with the barrier surface, is similarly cooled at a fast rate. The isolated thermometer initially has its temperature unchanged, and only slowly drops in temperature in response to the leak.

Figure 3:
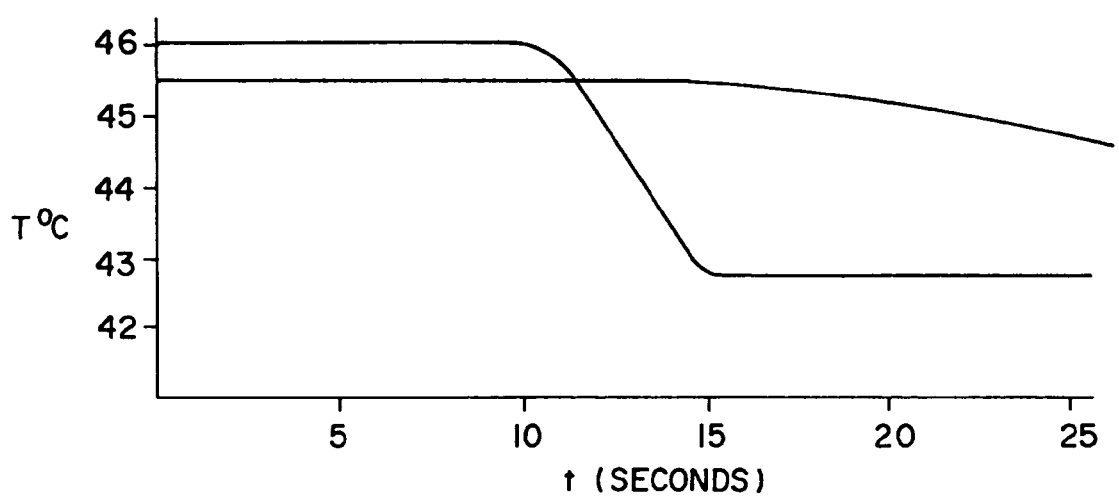
FIG. 3 demonstrates the changes in temperature between the two thermometers of the leak detector during a leak.

The difference in temperature between exposed and isolated thermometers may be measured in a variety of different manners to determine a leak. For example, as shown in FIG. 3, if gas flow in a mixed heat exchanger is typically 46° C. as measured by the isolated thermometer, then a reading of 43° C. will indicate a possible leak. Leaks indicated by measurement difference between the two thermometers depends on what systems are being monitored. However expected difference range from 1.5–12° C., with particular difference being 3–4° C. A change of the temperature signature that is opposite to the leak detecting signature serves to diagnose a failed thermometer element.

Though measuring temperature difference is a straightforward approach, gas flow systems in mixed heat exchangers experience temperature fluctuations that are not a result of a leak. Most of these types of temperature difference are temporary. Therefore in one embodiment, the present invention measures the changes in temperature between an exposed and isolated thermometer over time.

Similar to the example above, leaks indicated in changes in temperature over time vary depending on the type of heat exchanger monitored and the current running conditions. An example of how the temperature of a pair of thermometers may change due to a leak is given in FIG. 2. In this figure T2 represents an isolated thermometer, and T1 represents an exposed thermometer. Though the two thermometers have been in relatively stable thermally, it is expected that they may have slightly different baseline temperature. At approximately t=10 seconds water droplets from a leak begin to lower the temperature measured from the exposed thermometer. The temperature reading quickly drops by about 3° C. At t=15 the isolated thermometer beings to register the leak, but at a much slower rate. By measuring the changes in temperature over time by the simple formula:

$$\rho T1 - \rho T2$$

a numerical value is used to determined is there is a leak. In the example given above, any change in temperature over time by the above given formula that is larger than 2 indicates a potential leak. So, from t=10 to t=15 the change in temperature for the exposed thermometer is about 3, and the change in temperature for the isolated thermometer is about 0. Therefore 3−0>2 indicates a possible leak.

In another embodiment, the barrier hermetically seals at least the isolated thermometer from the gas flow. In this embodiment an inert gas may be sealed inside of the barrier. The inert gas should have a relatively low thermal conductivity, such as nitrogen. This will enhance the leak detection temperature signature sensitivity by delaying the speed of response for the isolated thermometer.

Figure 4:
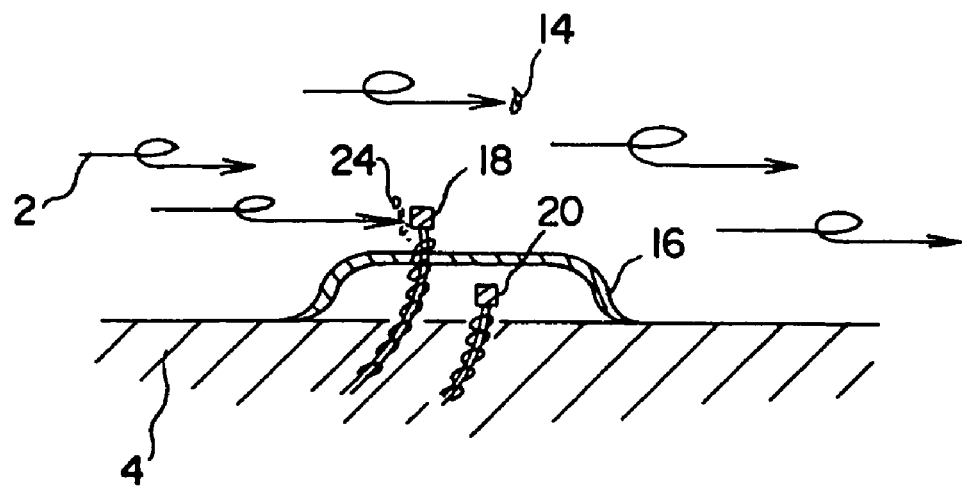
FIG. 4 illustrates a leak detector according to another embodiment of the present invention.
Figure 5:
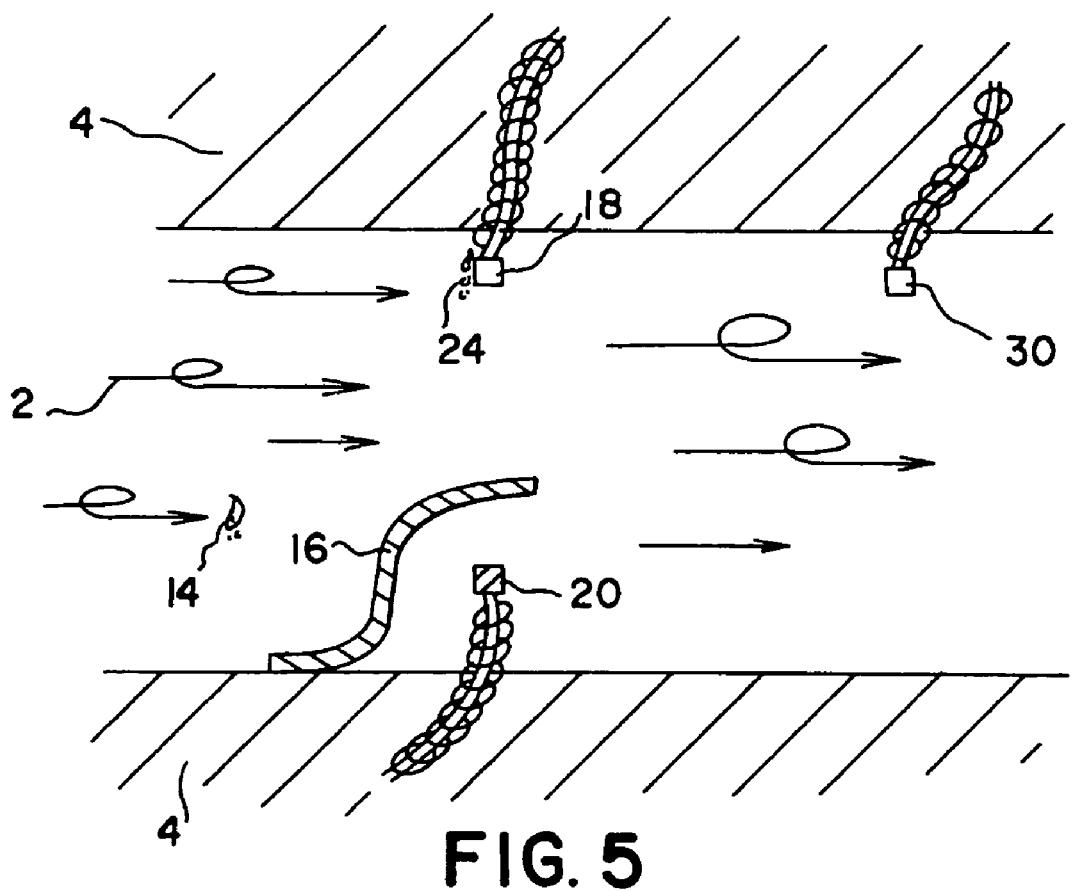
FIG. 5 illustrates a leak detector according to still another embodiment of the present invention.

FIG. 4 illustrates another embodiment of the present invention. Since the exposed thermometer 18 does not have to be shielded from the water droplets, it can be exposed directly to the air flow 2. This embodiment, however, may not be preferable to the embodiment show in FIG. 2 if the cross section of the thermometer is too narrow. FIG. 5 illustrates still another embodiment. In this figure the barrier 16 acts as a shield to direct water impact on the isolated thermometer 20, while still keeping it substantially open to the gas flow 2. In this embodiment a single isolated thermometer is being used as a comparison temperature for multiple exposed thermometers 18, 30. In this figure the size of the barrier is shown out of proportion for clarity, and in preferred embodiments does not noticeably interfere with gas flow.

In one embodiment the present invention comprises leak detectors for mixed heat exchangers. The leak detector comprises a first thermometer that is substantially exposed to a gas flow in a mixed heat exchanger and measures a first temperature. The exposure is such that water vapor and water droplets in the gas flow will come into thermal contact with the first thermometer. A second thermometer is substantially isolated from the gas flow and measures a second temperature. The isolation is such that water vapor and water droplets in the gas flow will not come into thermal contact with the second thermometer. A monitor receives reading of the two temperatures and determines a difference between the two. If this difference is greater than a predetermined threshold a leak is registered.

In one embodiment the second thermometer is substantially isolated from the gas flow by a barrier mounted in the gas flow portion of the mixed heat exchanger. In a related embodiment the barrier comprises a thermally conductive material. In a particular embodiment the first thermometer is in thermal contact with the thermally conductive material, thus allowing the first thermometer exposure to any water vapor or droplets in the gas flow.

In one embodiment a third thermometer substantially exposed to the gas flow in the mixed heat exchanger, where the third thermometer measure a third temperature. This third temperature is also compared to the second temperature by the monitor to determine leaks.

In another embodiment the monitor determines the difference between the first temperature and the second temperature over time. Thereby filtering out random spikes in the temperature of the gas flow.

In one embodiment the predetermined threshold is between 1.5–12° C., and in a particular embodiment it is 3° C.

In one embodiment the monitor is remotely located in relation to the mixed heat exchanger.

In another embodiment of the present invention, a leak detector for mixed heat exchangers comprises a barrier mounted in a gas flow section of a mixed heat exchanger and the barrier is at least in part made of a thermally conductive material. A first thermometer is located inside of the barrier and in thermal contact with the thermally conductive material and measures a first temperature. A second thermometer located inside of the barrier and is substantially isolated from the gas flow section, and measures a second temperature. A monitor that is remotely connected to the first thermometer and the second thermometer. The monitor measure a difference between the first temperature and the second temperature, and the leak detector registers a leak when the difference is greater than a predetermined threshold.

In one embodiment the monitor determines the difference between the first temperature and the second temperature over time.

In one embodiment the predetermined threshold is between 1.5–12° C.

In another embodiment the monitor is remotely located in relation to the mixed heat exchanger.

In a particular embodiment the mixed heat exchange is shut down when the leak is registered.

In another embodiment the present invention provides for a leak detection system for mixed heat exchangers. The system comprises two or more barriers located in a gas flow section of a mix heat exchanger. Each of the barriers comprises an isolated thermometer and an exposed thermometer, in that exposure and isolation refers to thermal exposure and thermal isolation of water vapor and water droplets in the gas flow. A first monitor determines a difference in temperature between the isolated thermometer and the exposed thermometer for each of the plurality of barriers, and a set of differences are created. Sid leak detector registers a leak when the difference is greater than a predetermined threshold. Then a second monitor compares the set of difference to approximate a location of the leak.

In one embodiment the monitor and the second monitor are remotely located in relation to the mixed heat exchanger.

In one embodiment the predetermined threshold is between 1.5–12° C.

In another embodiment the monitor determines the difference between the first temperature and the second temperature over time.

In still another embodiment the second monitor initiates a closure of the gas flow section in the region of the location of the leak.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A leak detector for mixed heat exchangers comprising:
   a barrier mounted in a gas flow section of a mixed heat exchanger, wherein said barrier comprises thermally conductive material;
   a first thermometer located inside of said barrier and in thermal contact with said thermally conductive material, wherein said first thermometer measures a first temperature;
   a second thermometer located inside of said barrier and substantially isolated from said gas flow section, wherein said second thermometer measures a second temperature; and
   a monitor that is remotely connected to said first thermometer and said second thermometer, wherein said monitor measures a difference between said first temperature and said second temperature;
   wherein said leak detector registers a leak when said difference is greater than a predetermined threshold temperature range.

2. The leak detector of claim 1, wherein said monitor determines said difference between said first temperature and said second temperature over time.

3. The leak detector of claim 2, wherein said predetermined threshold is between 1.5 and 12° C.

4. The leak detector of claim 2, wherein said monitor is remotely located in relation to said mixed heat exchanger.

5. The leak detector of claim 2, wherein said mixed heat exchange is shut down when said leak is registered.

* * * * *